United States Patent
Eckert

(10) Patent No.: US 9,287,752 B2
(45) Date of Patent: Mar. 15, 2016

(54) SYSTEMS FOR GENERATING ENERGY

(71) Applicant: Duerr Cyplan Ltd., Aldermaston, Reading Berkshire (GB)

(72) Inventor: Frank Eckert, Bad Lobenstein (DE)

(73) Assignee: DUERR CYPLAN LTD., Aldermaston, Reading Berkshire (GB)

( * ) Notice: Subject to any disclaimer, the term of this patent is extended or adjusted under 35 U.S.C. 154(b) by 42 days.

(21) Appl. No.: 13/935,191

(22) Filed: Jul. 3, 2013

(65) Prior Publication Data
US 2013/0292951 A1 Nov. 7, 2013

Related U.S. Application Data

(63) Continuation-in-part of application No. PCT/EP2011/074271, filed on Dec. 29, 2011.

(30) Foreign Application Priority Data

Jan. 5, 2011 (DE) ...................... 20 2011 001 111 U

(51) Int. Cl.
*H02K 7/18* (2006.01)
*F01K 15/02* (2006.01)
(Continued)

(52) U.S. Cl.
CPC ............... *H02K 7/1815* (2013.01); *F01K 15/02* (2013.01); *F01K 23/065* (2013.01); *F01K 23/10* (2013.01); *F01K 25/10* (2013.01); *F02G 5/02* (2013.01); *Y02E 20/14* (2013.01); *Y02T 10/166* (2013.01)

(58) Field of Classification Search
CPC ....... F01K 15/02; F01K 23/065; F01K 23/10; F01K 25/10; H02K 7/1815; F02G 5/02; Y02T 10/166; Y02E 20/14

USPC .......................................................... 290/1 A
See application file for complete search history.

(56) References Cited

U.S. PATENT DOCUMENTS 4,138,629 A * 2/1979 Miller et al. ................... 318/140
4,264,826 A * 4/1981 Ullmann ............................ 290/2
(Continued)

FOREIGN PATENT DOCUMENTS

DE  102010044889  5/2011
EP  0045843      2/1982
(Continued)

OTHER PUBLICATIONS

EP 0045843 translation.*
(Continued)

*Primary Examiner* — Tulsidas C Patel
*Assistant Examiner* — Viet Nguyen
(74) *Attorney, Agent, or Firm* — Hanley, Flight & Zimmerman, LLC

(57) ABSTRACT

Systems for generating energy are disclosed. An example system for generating energy includes an internal combustion engine that is to load a shaft with a torque. The internal combustion engine is to generate waste heat. A Rankine cycle plant is to be fed waste heat from the internal combustion engine to operate therewith a turbine coupled to a first electric generator. The first electric generator is connected to an electric motor which is coupled rotationally to the shaft to introduce an additional torque. The internal combustion engine is to drive a second electric generator. The second electric generator is to feed electric current into a high-power network configured to provide electrical power in a megawatt range.

17 Claims, 3 Drawing Sheets

(51) Int. Cl.
  *F01K 23/06* (2006.01)
  *F01K 23/10* (2006.01)
  *F01K 25/10* (2006.01)
  *F02G 5/02* (2006.01)

(56) References Cited

U.S. PATENT DOCUMENTS

| | | | | |
|---|---|---|---|---|
| 4,394,582 | A * | 7/1983 | Kreissl et al. | 290/4 C |
| 6,725,662 | B2 * | 4/2004 | Baba et al. | 60/620 |
| 6,962,056 | B2 * | 11/2005 | Brasz et al. | 60/772 |
| 7,475,541 | B2 * | 1/2009 | Ibaraki et al. | 60/618 |
| 8,739,531 | B2 * | 6/2014 | Teng et al. | 60/618 |
| 2008/0072568 | A1 * | 3/2008 | Moniz et al. | 60/226.1 |
| 2008/0088131 | A1 * | 4/2008 | Thisted | 290/44 |
| 2010/0126178 | A1 | 5/2010 | Hyde et al. | |
| 2011/0100014 | A1 * | 5/2011 | Hyde et al. | 60/767 |
| 2011/0192163 | A1 * | 8/2011 | Kasuya | 60/624 |
| 2011/0209473 | A1 * | 9/2011 | Fritz et al. | 60/605.2 |
| 2012/0019010 | A1 * | 1/2012 | Nakamura et al. | 290/1 R |

FOREIGN PATENT DOCUMENTS

| | | |
|---|---|---|
| EP | 1326017 | 7/2003 |
| WO | 2008/025688 | 3/2008 |

OTHER PUBLICATIONS

Patent Cooperation Treaty, "International Search Report," issued by the International Searching Authority in connection with PCT application No. PCT/EP2011/074271, mailed Aug. 21, 2012 (8 pages).

Patent Cooperation Treaty, "Written Opinion of the International Searching Authority," issued by the International Searching Authority in connection with PCT/EP2011/074271, mailed Aug. 21, 2012 (14 pages).

International Searching Authority, "International Preliminary Report on Patentability," issued in connection with International Patent Application No. PCT/EP2011/074271, mailed on Jul. 10, 2013, 9 pages.

International Searching Authority, "Written Opinion," issued in connection with International Patent Application No. PCT/EP2011/074271, mailed on Jul. 10, 2013, 8 pages.

* cited by examiner

SYSTEMS FOR GENERATING ENERGY

RELATED APPLICATION

This patent arises from a continuation-in-part of International Patent Application No. PCT/EP2011/074271 which was filed on Dec. 29, 2011, which claims priority to German Patent Application No. 20 2011 001 111.9 of which was filed on Jan. 5, 2011, both of which are hereby incorporated herein by reference in their entireties.

FIELD OF THE DISCLOSURE

This disclosure relates generally to generating energy, and, more particularly, to systems for generating energy.

BACKGROUND

Devices for generating energy are described in German utility model application DE 20 2011 001 111.9 with the utility model specification DE 20 2011 001 111 U1, both of which are hereby incorporated herein by reference in their entireties.

BRIEF DESCRIPTION OF THE DRAWINGS

Wherever possible, the same reference numbers will be used throughout the drawing(s) and accompanying written description to refer to the same or like parts.

DETAILED DESCRIPTION

The examples disclosed herein relate to apparatus, systems and/or devices for generating electrical or mechanical energy having an internal combustion engine which loads a shaft with a torque, the internal combustion engine generating waste heat, and having an RC plant which is fed waste heat from the internal combustion engine, in order to operate therewith a turbine which is coupled to an electric generator.

Figure 1:
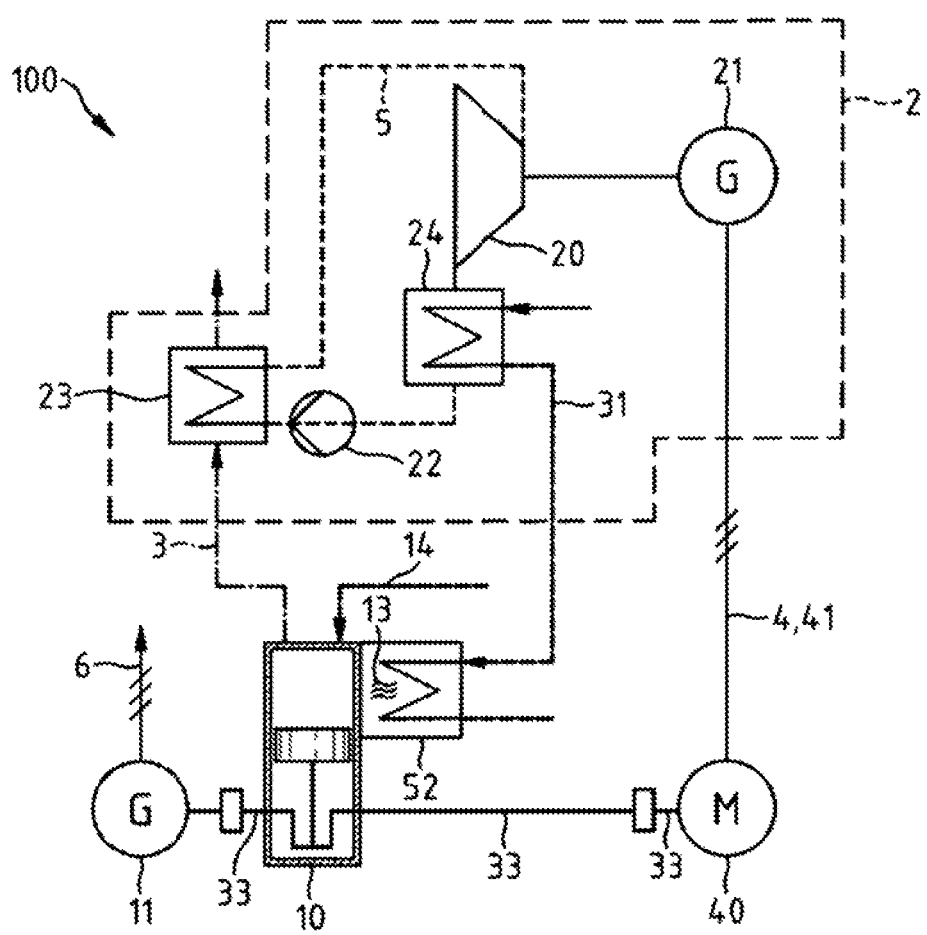
FIG. 1 shows an example system for generating energy having an internal combustion engine in the form of a combustion engine and having an electric generator which feeds an electric motor.

An example device, arrangement, apparatus, system and/or assembly 100 for generating energy which is shown in FIG. 1 has an internal combustion engine 10 which is assigned to and/or associated with an ORC plant 2. In particular, a reciprocating piston internal combustion engine is selected as the internal combustion engine 10. In some examples, the internal combustion engine 10 is operated, in particular, by spark ignition according to the Otto process, or is operated according to the compression-ignition diesel process. The liquid or gaseous hydrocarbons mentioned at the outset and gaseous hydrogen are particularly suitable as fuels for a reciprocating piston internal combustion engine according to the disclosed examples. The internal combustion engine 10 loads a shaft 33 with a torque, the internal combustion engine 10 being operated in a particularly advantageous way at an approximately constant rotational speed and an approximately constant torque over relatively long time periods (t>1 h) in a range of its highest degree of efficiency. A generator 11 is driven by way of the shaft 33. The internal combustion engine 10 is supplied with combustion air via a line 14. The internal combustion engine 10 produces exhaust gas which is guided through an exhaust gas line 3 to the ORC plant 2. The above-described system 100 is preferably to be realized in stationary combined heat and power plants, small power stations, pumping stations, compressor stations, trucks, trains or on ships. However, the system 100 may be used in any other suitable process and/or apparatus.

In some examples, the ORC plant 2 comprises a turbine 20 which is configured as a steam turbine and is arranged in a working medium circuit 5. For example, butane, toluene, silicone oil or else ammonia are used as (fluid) working medium. A generator 21 is coupled to the turbine 20. The ORC plant 2 has a working medium condenser 24. There is a feed pump 22 which acts as a working medium pump in the ORC plant 2. The fluid working medium is brought to operating pressure in the liquid state by way of the feed pump 22. The liquid working medium flows through a heat exchanger 23 which acts as an evaporator.

Here, the heat from the exhaust gas of the internal combustion engine 10 is transmitted to the working medium. The working medium evaporates in the process. Saturated steam or dry steam is then provided at the outlet of the heat exchanger 23. Here, the specific volume and the temperature of the steam increase as a result of the introduction of energy in the heat exchanger 23.

The steam of the working medium is then relieved virtually isentropically to a lower pressure via the turbine 20 which is connected to the generator 21. As a result, the specific volume rises on account of the expansion in the turbine 20. The associated increase in volume of the working medium, caused by the pressure difference, brings about resulting work in the form of volume changing work which the turbine 20 converts at its blades into mechanical energy. The turbine 20 drives the generator 21. The generator 21 supplies an internal high-frequency power network 4 for three-phase current of the system 100 with electrical energy. The internal high-frequency power network 4 is designed for a current frequency in a range from, for example, 100 Hz to 1000 Hz, preferably from 250 Hz to 500 Hz. The internal power network 4 in the system 100 comprises a line system 41. The line system 41 connects the generator 21 to the electric motor 40 in the system 100.

The steam passes from the turbine 20 into the working medium condenser 24. The working medium condenser 24 is a heat exchanger, through which a coolant circuit 31 is guided which contains a cooling liquid. Via the coolant circuit 31, the heat which is output during the condensation is fed into a heat network (not shown in further detail). As an alternative to this, it is also possible to discharge the heat of the coolant which is guided in the coolant line 31 to the surroundings via a heat exchanger.

In some examples, the heat exchanger 24 which acts as a condenser, the working medium condenses and in the process changes completely into the liquid state. The working medium is then brought to operating pressure again by way of the feed pump 22 which acts as working medium pump and passes again into the heat exchanger 23 which acts as an evaporator. The circuit for the working medium in the ORC plant 2 is then closed.

The electric current which is generated by way of the generator 11 is fed into an external power network 6. The power network 6 can be designed, for example, for a fixed voltage in the order of magnitude of 230 V, 400 V, 690 V or else higher. The electrical power, for which the power network 6 is designed, preferably lies in the megawatt range.

In some examples, the power network 6 is separate from the internal power network 4 which the generator 21 supplies.

The electrical frequency in the internal power network 4 during operation of the system 100 lies above the electrical frequency in the external power network 6 which is fed via the generator 11 which is driven by way of the internal combustion engine 10. The feed pump 22 is driven by electrical energy from the internal power network 4.

Figure 2:
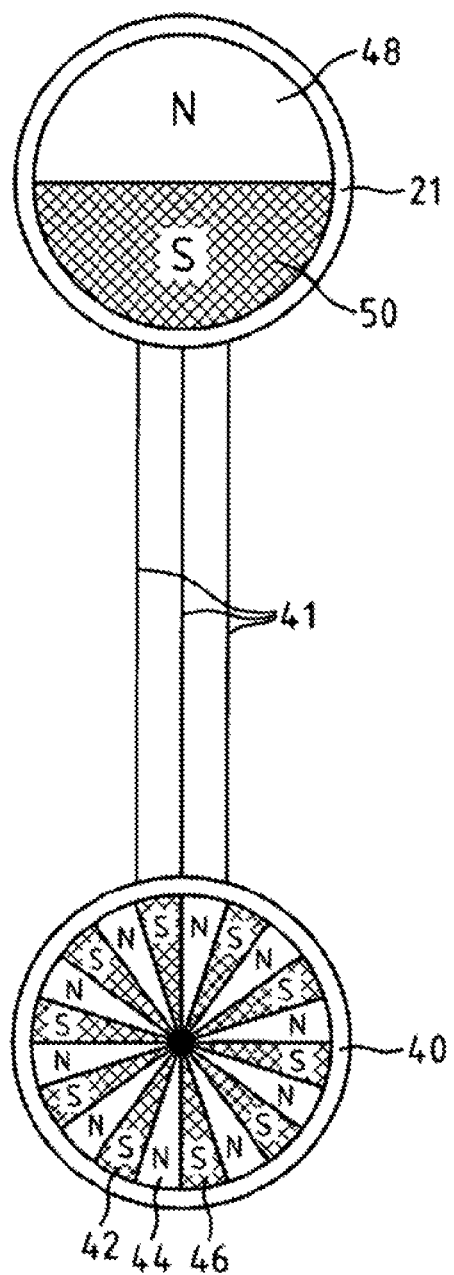
FIG. 2 shows the electric generator with the electric motor in the system.

FIG. 2 shows the electric generator 21 with the electric motor 40 in the system 100. The electric motor 40 is connected via a plurality of line sections 41 to the power network 4 which is fed by the generator 21. The electric power of the generator 21 which is driven by the turbine 20 in a Rankine process is output via the electric motor 40 to a shaft 33 which is coupled to the internal combustion engine 10.

In some examples, in order to adapt the rotational speed of the electric motor 40 to the rotational speed of the internal combustion engine 10 or the rotational speed of the generator 11 which is driven thereby, the electric motor 40 has a higher number of poles 42, 44, 46 than the generator 21 which is connected to the turbine 20. On account of the different number of poles 42, 44, 46 of the electric motor 40 and of the poles 48, 50 of the generator 11, the electric motor 40 and the generator 21 which is connected to it act like an electric gear mechanism and/or gear. The rotational speed of the generator 21 multiplied by its number of poles divided by the number of poles of the electric motor 40 results in the rotational speed of the electric motor 40 when the latter is configured as what is known as a synchronous motor. If the electric motor 40 is an asynchronous motor, its rotational speed lies somewhat below the rotational speed which is specified above. It is noted that the different number of poles in the generator 21 and the electric motor 40 is shown merely symbolically in FIG. 2. Any possible additionally necessary or expedient components, such as electricity meters, switches or synchronizing units, etc., are not shown there.

In some examples, the rotational speed of the shaft of the turbine 20 and the rotational speed of the generator 21 can preferably be selected in the range from approximately 10000 rpm to approximately 40000 rpm. Therefore, according to the disclosed examples, said rotational speeds lie roughly higher by a power of 10 than the rotational speed of the shaft 33 of the internal combustion engine 10 and of the electric motor 40 which is preferably between about 1500 rpm and 3000 rpm.

Moreover, in some examples, it is advantageous, in particular, in an ORC plant which is designed for high temperatures to arrange what is known as a recuperator between the turbine 20 and the working medium condenser 24 in order to increase the efficiency, in which recuperator the temperature of the working medium in the ORC plant 2 is lowered to the condensation temperature.

In some examples, the internal combustion engine 10 in the system 100 of FIG. 1 has a radiator 52, in which engine cooling water 13 discharges heat to the cooling liquid in the circuit 31. Therefore, not only the heat of the engine cooling water 13 but also the heat from the working medium condenser 24 of the ORC plant 2 are transported away by way of the circuit 31.

Figure 3:
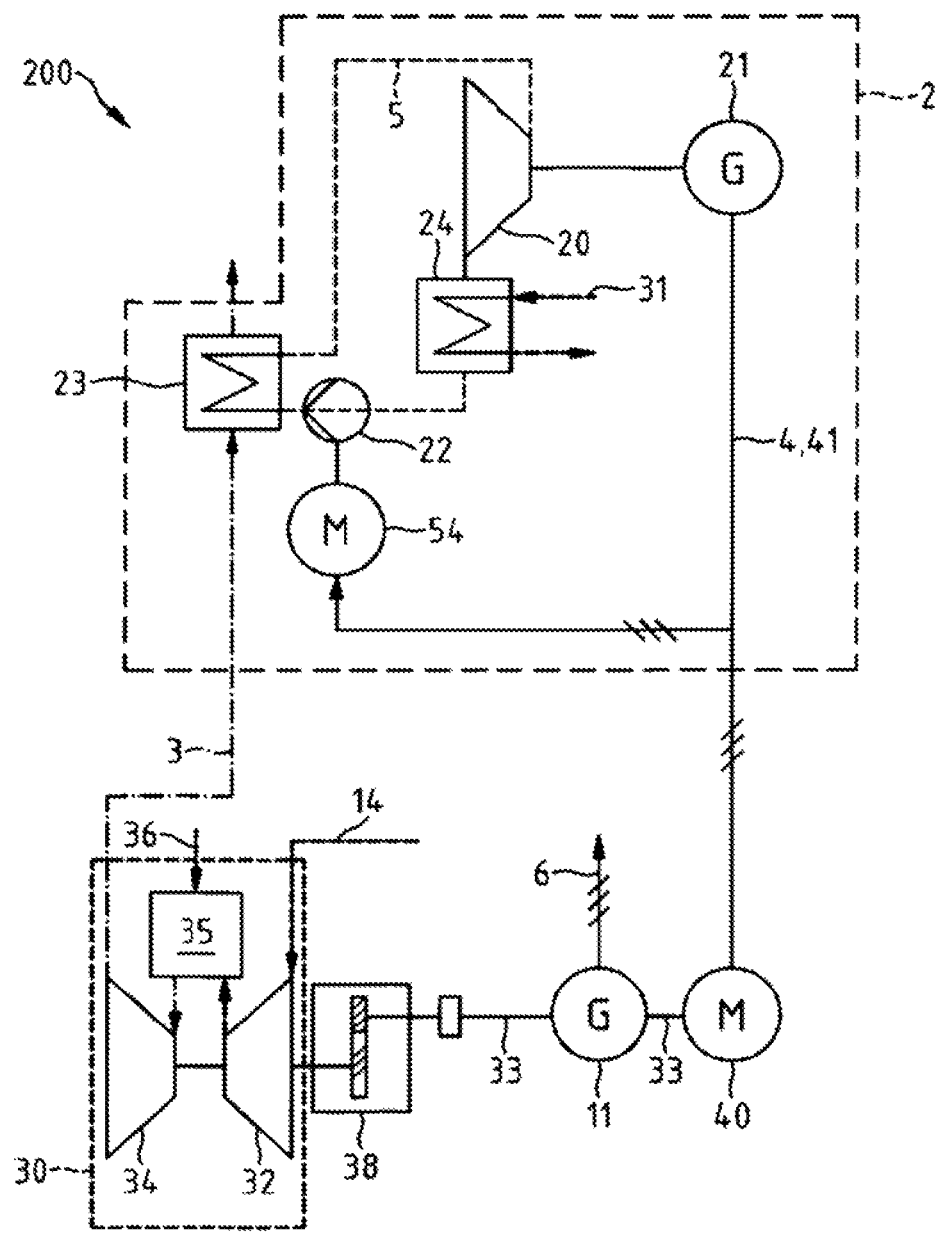
FIG. 3 shows an example system for generating energy with a gas turbine.

FIG. 3 shows an example device, arrangement, apparatus, system and/or assembly 200 for generating energy having an internal combustion engine in the form of a gas turbine 30. The gas turbine 30 has a compressor impeller 32 and a turbine wheel 34. The compressor impeller 32 serves to compress combustion air which is fed in via a line 14. The combustion air passes into a combustion chamber 35, in which, mixed with fuel from a line 36, it is burned to produce exhaust gas, by means of which the turbine wheel 34 is driven. The gas turbine 30 is arranged in a combined heat and power unit. Insofar as the construction of the system 200 corresponds to the construction of the system 100 from FIG. 1, functionally like or identical assemblies in FIG. 2 are provided with identical designations in relation to FIG. 1.

Here, a gear mechanism 38 is arranged between the gas turbine 30 which can also be configured as what is known as a micro gas turbine and the generator 11 which is driven by way of the gas turbine 30. The gear mechanism 38 serves to adapt the rotational speed of the gas turbine 33 to the rotational speed of the shaft 30 with the generator 11 and the electric motor 40. It is to be noted that, in the case of a corresponding rotational speed design of the generator 11 and electric motor 40, the gear mechanism 38 can possibly be dispensed with. Moreover, in some examples, it is possible to also provide a gear mechanism of this type only for coupling the generator 11 or the electric motor 40.

The feed pump 22 in the RC or ORC plant 2 has an electric motor 54 which is supplied with electrical energy via the internal power network 4. Operation at higher rotational speeds can thus be made possible or simplified for the feed pump 22. In order to adapt the rotational speed of the feed pump 22 to the internal power network, the number of poles of the electric motor 54 of the feed pump 22 is co-ordinated with the number of poles in the generator 21. It is also the case here that a gear mechanism effect can be achieved by the electric motor 54 being connected to the generator 21 in the power network 4.

The systems 100, 200 for generating energy which are described in the above text and are shown in FIG. 1 and FIG. 3 are advantageous, in particular, if the internal power network 4 and the external power network 6 are to be operated with great frequency differences in said systems. If, in contrast, it is desired to operate the internal combustion engine 10 and the turbine 20 at an approximately identical rotational speed, a correspondingly separate internal power network 4 in a system 100, 200 can also be dispensed with. In this case, the internal combustion engine 10 can be connected with the turbine 20 to a common shaft 33.

In some examples, a system 100, 200 can also be used to drive a machine, a vehicle or a ship directly or via a gear mechanism. In some examples, a system 100, 200 is suitable, in particular, for operation in a station for compressing gases, in which the internal combustion engine is coupled, in particular, directly or via a gear mechanism to a compressor unit for compressing gas. If the gas to be compressed is a combustible gas in the form of hydrogen, methane or natural gas or the like, it is provided, in particular, to configure the internal combustion engine as a gas engine or as a gas turbine and to utilize the combustible gas as fuel for the internal combustion engine. Furthermore, it can be provided in this case to make the mechanical energy which is obtained via the RC/ORC process available completely to the internal combustion engine again as mechanical energy via the electric coupling according to the disclosed examples (disregarding conversion losses).

For example, drives in industrial production plants, in particular drives in paint shops or conveying systems, can be fed with the electrical energy which is provided in the internal power network 4 of a system 100, 200.

Drives for fans for ventilating pre-treatment and cataphoretic painting tunnels or spray booths can also be supplied with electrical energy by way of an internal power network of this type. The internal power network in a system 100, 200 is also suitable in principle for operating electric consumers in clean rooms, dryers, intermediate dryers, cooling zones, air locks and waste air purification plants.

The examples disclosed herein relate to a system 100, 200 for generating energy. The system for generating energy 100,

200 comprises an internal combustion engine 10 which loads a shaft 33 with a torque. The internal combustion engine 10 generates waste heat. In the system 100, 200, there is an RC plant 2 which is fed waste heat from the internal combustion engine 10, in order therewith to operate a steam turbine 20 which is coupled to an electric generator 21. The system 100, 200 has an electric motor 40 which is fed by the electric generator 21 and is coupled rotationally to the shaft 33 for the introduction of an additional torque.

In some examples, an internal combustion engine or combustion engine is understood to be a heat engine with internal combustion, in which expanding, hot combustion products (exhaust gases) are produced by exothermal chemical reaction. Mechanical energy can be obtained and transmitted to a shaft via a controlled expansion of the exhaust gases which are produced by the combustion. In some examples, an internal combustion engine can also comprise a plurality of interacting heat engines with internal combustion and/or an interconnection of a heat engine and other systems (electric motors, heat exchangers, stationary burners, etc.). In particular, a reciprocating piston internal combustion engine is provided as heat engine, in which reciprocating piston internal combustion engine hydrocarbons are burned explosively in a plurality of working cylinders in such a way that pistons which are guided in the working cylinders can output rotational energy to the outside via a common crankshaft. Depending on the design, reciprocating piston internal combustion engines of this type run with the highest degree of efficiency in narrow rotational speed ranges (+/−250 rpm) which are to be assumed to be between about 500 rpm and 5000 rpm. In some examples, a heat engine in the form of a gas turbine or micro gas turbine also understood to be an internal combustion engine or combustion engine.

For example, mineral oil or mineral oil derivatives such as methane or heavy oil, but also natural gas, landfill gas, sewer gas, marsh gas, biogas or else hydrogen gas can be used as fuels for operating a system according to the examples disclosed herein. However, hydrogen, in particular, can also be used as fuel for operating a system according to the disclosed examples.

In some examples, an RC plant (RC=Rankine cycle) is to be understood to be a plant, in which heat is converted into mechanical energy by way of a thermodynamic cyclic process using a working medium which is guided in a circuit, for example water or steam.

In some examples, an RC plant is assigned and/or associated with a turbine to a (stationary) reciprocating piston internal combustion engine, in order to convert a certain proportion of the waste heat of the reciprocating piston internal combustion engine into mechanical energy via an RC process. Here, the mechanical energy is available, in particular, as rotational energy of said turbine. On account of different rotational speeds firstly of reciprocating piston internal combustion engines (rotational speed $n1<5000$ rpm) and secondly of steam turbines (rotational speed $n2>10\,000$ rpm), however, it is difficult to combine the mechanical energies which are produced by way of reciprocating piston internal combustion engines and steam turbines. In particular in the case of coupling them together on a shaft, an equalization of the different rotational speeds would have to take place via complicated mechanical gear mechanisms. In particular in the case of a feed into a single power network (in particular, also into a public power network), electronic frequency converters would have to be used in some circumstances or an equalization of the different rotational speeds would have to take place via mechanical gear mechanisms which are connected between the internal combustion engine or the steam turbine and a common generator.

In the case of variable frequencies, frequency converters lead to high power losses. Mechanical gear mechanisms with a fixed transmission ratio have the disadvantage that, using said mechanical gear mechanisms, either the combustion engine or the steam turbine can be operated only in rotational speed ranges which are not optimum.

In some examples, the disclosed examples provide an example system for generating energy, in which the energy of the fuel for the internal combustion engine can be converted into mechanical or electrical energy with an improved degree of efficiency.

In some examples, an example system for generating power comprises an electric motor which is connected (electrically) to the electric generator and is coupled rotationally to the shaft for the introduction of an additional torque.

In accordance with the examples disclosed herein, different favorable rotational speeds of an internal combustion engine and a steam turbine can be combined advantageously, that is to say in a low-loss and/or wear-free manner, by the steam turbine being coupled to the internal combustion engine via an electric motor which assists the internal combustion engine. For this purpose, the electric motor can be connected to the drive or output shaft of the internal combustion engine.

In accordance with the examples disclosed herein, said electric motor is preferably fed via a generator via an internal power network, the internal power network preferably conducting high-frequency alternating current in the system and it being possible for it to also supply further consumers in the form of pumps, compressors or the like with electrical energy in addition to the electric motor.

In some examples, the electric motor is configured as what is known as a synchronous motor and also to design the generator as a synchronous generator, in particular as a three-phase generator. In accordance with the examples disclosed herein, the number of poles of the generator is smaller here than the number of poles of the electric motor. In some examples, the electric motor in a system in accordance with the examples disclosed herein can also be designed as an asynchronous motor.

In accordance with the examples disclosed herein, there is a steam turbine which is coupled to the electric generator in the RC plant. In order to generate electrical energy by way of a system according to the examples disclosed herein (for example, within the context of a combined heat and power plant or small power station), an electric generator for generating electricity is driven by way of the internal combustion engine. The internal combustion engine can be configured as a combustion engine or as a gas turbine. In particular, it is possible to couple the internal combustion engine and the electric generator by means of a gear mechanism. However, for example, a vehicle or a ship can also be driven via the internal combustion engine by way of the system according to the disclosed examples. However, for example, a pump or compressor unit for delivering and/or compressing fluids can also be driven via the internal combustion engine by way of the system according to the disclosed examples. In the last-mentioned cases, the mechanical power output of the internal combustion engine is frequently also consumed as mechanical power.

The RC plant in a system according to the disclosed examples can receive heat from the cooling water of the internal combustion engine or can be fed with waste heat which is removed from the exhaust gas which an internal combustion engine produces.

The RC plant in a system according to the disclosed examples can be, in particular, what is known as an ORC plant (ORC=organic Rankine cycle). An ORC plant is an RC plant, in which heat is converted into mechanical energy by way of a thermodynamic cyclic process, wherein it is not steam which is used as working medium in a working medium circuit which is similar to a steam circuit, but rather usually organic media such as butane, toluene, silicone oil or else ammonia which have a low evaporation temperature in relation to water. According to the disclosed examples, instead of the stated working media, water or a mixture of a water-soluble medium with water can also be used. In this case, the preferred ORC plant would be replaced by an equivalent RC plant, without deviating from the examples disclosed herein.

In an ORC plant, the working medium is loaded with pressure. As a rule, an ORC plant comprises a pump for this purpose. The working medium which is loaded with pressure is then heated in an evaporator. Here, the working medium is evaporated or superheated. The evaporated or superheated working medium is then guided to a steam turbine. Here, it is relieved to a low pressure with the generation of mechanical energy and is subsequently condensed. In the circuit of the ORC plant, the working medium is then loaded with pressure again and is fed to the evaporator, where it is again heated and again evaporated. In some examples, media can also be used as working medium in an ORC plant, the evaporation temperature of which media is higher than that of water. ORC plants can be advantageously used for the generation of electrical or mechanical energy from heat, in particular, when the available temperature gradient between a heat source and a heat sink is too low, in order to operate a heat engine, for instance a turbine, with steam.

ORC plants are operated not only with heat from combustion systems. In some examples, the heat which is required to operate an ORC plant can also be obtained geothermally or can come from solar power plants. In some examples, ORC plants can also, in particular, be operated with the waste heat of internal combustion engines.

In some examples, the system (100, 200) for generating energy includes an internal combustion engine (10, 30) which loads a shaft (33) with a torque, the internal combustion engine (10, 30) generating waste heat, and having an RC plant (2) which is fed waste heat from the internal combustion engine (10, 30), in order to operate therewith a turbine (20) which is coupled to an electric generator (21), including an electric motor (40) which is connected to the electric generator (21) and is coupled rotationally to the shaft (33) for the introduction of an additional torque.

In some examples, the electric motor (40) is a synchronous motor and the generator (21) is configured as a synchronous generator, the number of poles of the generator (21) being smaller than the number of poles of the electric motor (40).

In some examples, the electric motor (40) is configured as an asynchronous motor.

In some examples, the internal combustion engine (10) drives an electric generator (11) for generating electricity.

In some examples, the internal combustion engine is configured as a combustion engine (10).

In some examples, the internal combustion engine is configured as a gas turbine (30).

In some examples, the internal combustion engine (10, 30) and the electric generator (11) are coupled by means of a gear mechanism (38).

In some examples, the internal combustion engine drives a vehicle or a ship.

In some examples, the RC plant is an ORC plant (2).

In some examples, the internal combustion engine (10) is cooled with cooling water (13) and the RC plant (2) receives waste heat of the internal combustion engine (10) from the cooling water (13).

In some examples, the internal combustion engine (10) produces exhaust gas and the RC plant (2) receives waste heat of the internal combustion engine (10) from the exhaust gas.

An example system (100, 200) for generating energy includes an internal combustion engine (10, 30) which loads a shaft (33) with a torque, the internal combustion engine (10, 30) generating waste heat, and having an RC plant (2) which is fed waste heat from the internal combustion engine (10, 30), in order to operate therewith a turbine (20) which is coupled to an electric generator (21), which generator (21) is connected to an electric motor (40) which is coupled rotationally to the shaft (33) for the introduction of an additional torque, in which the internal combustion engine (10) drives an electric generator (11) which is intended to feed electric current into a high-power network which is designed to provide electrical power in the megawatt range.

In some examples, the number of poles of the generator (21) which is coupled to the turbine (20) is smaller than the number of poles of the electric motor (40).

In some examples, an example system (100, 200) for generating energy having an internal combustion engine (10, 30) which loads a shaft (33) with a torque, the internal combustion engine (10, 30) generating waste heat, and having an RC plant (2) which is fed waste heat from the internal combustion engine (10, 30), in order to operate therewith a turbine (20) which is coupled to an electric generator (21), which generator (21) is connected to an electric motor (40) which is coupled rotationally to the shaft (33) for the introduction of an additional torque, in which the number of poles of the generator (21) which is coupled to the turbine (20) is smaller than the number of poles of the electric motor (40).

In some examples, the internal combustion engine (10) drives an electric generator (11) which is intended to feed electric current into a high-power network which is designed to provide electrical power in the megawatt range.

In some examples, the electric motor (40) is a synchronous motor or an asynchronous motor and the generator (21) which is coupled to the turbine (20) is configured as a synchronous generator.

In some examples, the electric motor (40) is connected via a plurality of line sections (41) to the generator (21) which is coupled to the turbine (20).

In some examples, the internal combustion engine is configured as a combustion engine (10).

In some examples, the internal combustion engine is configured as a gas turbine (30).

In some examples, the internal combustion engine (10, 30) and the electric generator (11) which is driven by way of the internal combustion engine (10, 39) are coupled by means of a gear mechanism (38) which adapts the rotational speed of the internal combustion engine (10, 20) to the rotational speed of the electric motor (40).

In some examples, the internal combustion engine drives a vehicle or a ship.

In some examples, the RC plant is an ORC plant (2).

In some examples, the internal combustion engine (10) is cooled with cooling water (13) and the RC plant (2) receives waste heat of the internal combustion engine (10) from the cooling water (13).

In some examples, the internal combustion engine (10) produces exhaust gas and the RC plant (2) receives waste heat of the internal combustion engine (10) from the exhaust gas.

An example method for generating electrical energy having a system as discussed above in which the electric generator (11), which is driven by way of the internal combustion engine (10), is operated at a rotational speed which lies between about 10000 rpm and 40000 rpm.

In some examples, the rotational speed of the shaft which is loaded with a torque by the internal combustion engine (10, 30) lies between about 1500 and 3000 rpm.

It is noted that this patent claims priority from a continuation-in-part of International Patent Application No. PCT/EP2011/074271 which was filed on Dec. 29, 2011, which claims priority to German Patent Application No. 20 2011 001 111.9 of which was filed on Jan. 5, 2011, both of which are hereby incorporated herein by reference in their entireties.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A system for generating energy, comprising:
    an internal combustion engine that is to load a first shaft with a first torque, the internal combustion engine to generate waste heat, a gear mechanism coupling the first shaft and a second shaft, the gear mechanism to operate the second shaft at a first speed in response to the internal combustion engine driving the first shaft at a second speed, a Rankine cycle plant is to be fed waste heat from the internal combustion engine to operate therewith a turbine coupled to a first electric generator, wherein the first electric generator is connected to an electric motor, the electric motor being coupled rotationally to the second shaft to introduce a second torque to the second shaft to drive the second shaft at the first speed, the second shaft is to operate a second electric generator, wherein the second electric generator is to feed electric current into a high-power network to provide electrical power in a megawatt range.

2. The system as claimed in claim 1, wherein a number of poles of the first electric generator is smaller than a number of poles of the electric motor.

3. The system as claimed in claim 1, wherein the second electric generator is to be operated at a rotational speed of between about 10000 rpm and 40000 rpm.

4. The system as claimed in claim 1, wherein a rotational speed of the first shaft is between about 1500 rpm and 3000 rpm.

5. A system for generating energy, comprising:
    an internal combustion engine that is to load a shaft with a first torque to drive the shaft at a first speed, the internal combustion engine to generate waste heat, wherein a Rankine cycle plant is to be fed waste heat from the internal combustion engine to operate therewith a turbine coupled to a first electric generator, wherein the first electric generator is connected to an electric motor, the electric motor being coupled rotationally to the shaft to introduce a second torque to the shaft to drive the shaft at the first speed, wherein a number of poles of the first electric generator is smaller than a number of poles of the electric motor to enable the electric motor to drive the shaft at the first speed while the first electric generator is operated at a different speed than the electric motor.

6. The system as claimed in claim 5, wherein the internal combustion engine is to drive a second electric generator which is to feed electric current into a high-power network to provide electrical power in a megawatt range.

7. The system as claimed in claim 5, wherein the electric motor is a synchronous motor or an asynchronous motor and the first electric generator is configured as a synchronous generator.

8. The system as claimed in claim 5, wherein the electric motor is connected via line sections to the first electric generator.

9. The system as claimed in claim 5, where the internal combustion engine is configured as a combustion engine.

10. The system as claimed in claim 5, wherein the internal combustion engine is configured as a gas turbine.

11. The system as claimed in claim 10, wherein the internal combustion engine and a second electric generator which is driven by the internal combustion engine are coupled by a gear mechanism, wherein the gear mechanism is to adapt a rotational speed of the internal combustion engine to the rotational speed of the electric motor.

12. The system as claimed in claim 5, wherein the internal combustion engine is to drive a vehicle or a ship.

13. The system as claimed in claim 5, wherein the Rankine cycle plant is an organic Rankine cycle plant.

14. The system as claimed in claim 5, wherein the internal combustion engine is to be cooled with cooling water and the Rankine cycle plant is to receive waste heat of the internal combustion engine from the cooling water.

15. The system as claimed in claim 5, wherein the internal combustion engine produces exhaust gas and the Rankine cycle plant is to receive waste heat of the internal combustion engine from the exhaust gas.

16. The system as claimed in claim 5, wherein a second electric generator, which is to driven by way the internal combustion engine, is to be operated at a rotational speed is between about 10000 rpm and 40000 rpm.

17. The system as claimed in claim 5, wherein the rotational speed of the shaft is between about 1500 rpm and 3000 rpm.

* * * * *